United States Patent
Furusho et al.

(10) Patent No.: US 10,266,730 B2
(45) Date of Patent: Apr. 23, 2019

(54) THERMALLY AND ELECTRICALLY CONDUCTIVE ADHESIVE COMPOSITION

(71) Applicant: TANAKA KIKINZOKU KOGYO K. K., Chiyoda-ku, Tokyo (JP)

(72) Inventors: Rikia Furusho, Hiratsuka (JP); Shintaro Abe, Hiratsuka (JP); Takeshi Kondo, Hiratsuka (JP); Teruki Tanaka, Hiratsuka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 0 days.

(21) Appl. No.: 15/547,390

(22) PCT Filed: Jan. 27, 2016

(86) PCT No.: PCT/JP2016/052245
§ 371 (c)(1),
(2) Date: Jul. 28, 2017

(87) PCT Pub. No.: WO2016/125644
PCT Pub. Date: Aug. 11, 2016

(65) Prior Publication Data
US 2018/0010020 A1     Jan. 11, 2018

(30) Foreign Application Priority Data

Feb. 2, 2015    (JP) ................. 2015-018139

(51) Int. Cl.
| | |
|---|---|
| *C09J 163/04* | (2006.01) |
| *C09J 163/00* | (2006.01) |
| *C08K 9/04* | (2006.01) |
| *C09J 11/04* | (2006.01) |
| *C09J 9/02* | (2006.01) |
| *C09J 11/06* | (2006.01) |
| *H01B 1/22* | (2006.01) |
| *C08G 59/38* | (2006.01) |
| *C08G 59/50* | (2006.01) |

(52) U.S. Cl.
CPC ............ *C09J 11/04* (2013.01); *C09J 9/02* (2013.01); *C09J 11/06* (2013.01); *C09J 163/04* (2013.01); *H01B 1/22* (2013.01)

(58) Field of Classification Search
None
See application file for complete search history.

(56) References Cited

U.S. PATENT DOCUMENTS

| | | | | |
|---|---|---|---|---|
| 9,773,582 | B2* | 9/2017 | Iseda | ......... H01B 1/22 |
| 2015/0247067 | A1* | 9/2015 | Iseda | ......... C08K 3/08 |
| | | | | 428/414 |
| 2015/0344749 | A1* | 12/2015 | Ochi | ......... C09J 9/02 |
| | | | | 252/75 |

FOREIGN PATENT DOCUMENTS

| | | |
|---|---|---|
| CN | 102174306 A | 9/2011 |
| CN | 103540287 A | 1/2014 |
| JP | 2000-239636 A | 9/2000 |
| JP | 2013-175559 A | 9/2013 |
| JP | 2013-214733 A | 10/2013 |
| WO | WO 2014/003159 A1 | 1/2014 |
| WO | WO-2014050155 A1 * | 4/2014 ............... C08K 3/08 |
| WO | WO 2014/104046 A1 | 7/2014 |

OTHER PUBLICATIONS

Machine translation of JP 2000-239636 A (no date).*
PCT, International Search Report for PCT/JP2016/052245, dated Apr. 26, 2016.
EP, European Extended Search Report for EP application No. 16746475.9, dated Jun. 22, 2018.

* cited by examiner

*Primary Examiner* — Michael J Feely
(74) *Attorney, Agent, or Firm* — Orrick, Herrington & Sutcliffe LLP; Joseph A. Calvaruso

(57) ABSTRACT

[Problem] Provided is a thermally and electrically conductive adhesive composition used as a die-bonding material which shows high heat dissipation performance and stable electric conductivity as well as high adhesion force.
[Solution] Provided is a thermally and electrically conductive adhesive composition, comprising: (A) an electrically conductive filler; (B) an epoxy resin; (C) a curing agent, and (D) an organic solvent, in which the electrically conductive filler (A) is a submicron fine silver powder, and the content of the electrically conductive filler (A) is such that (A)/(B) is 96.0/4.0 to 99.5/0.5 in the mass ratio to the content of the epoxy resin (B); and the epoxy resin (B) comprises at least a bisphenol-type epoxy resin and a novolac-type epoxy resin; and the curing agent (C) is diaminodiphenyl sulfone and/or a derivative thereof, and the content of the curing agent (C) is 0.4 to 2.4 molar equivalents in terms of equivalent of active hydrogen relative to 1 molar equivalent of epoxy groups in the epoxy resin (B).

7 Claims, No Drawings

THERMALLY AND ELECTRICALLY CONDUCTIVE ADHESIVE COMPOSITION

TECHNICAL FIELD

The present invention relates to a thermally and electrically conductive adhesive composition. More specifically, the present invention relates to a thermally and electrically conductive adhesive composition for use as a bonding material (a die-bonding material) to bond a semiconductor device to a lead frame, a substrate, or the like, the composition showing high heat-dissipation performance and stable electric conductivity as well as high adhesion force.

BACKGROUND

In recent years, there are rapidly increasing demands for smaller and more sophisticated electronic components, for example, power devices and light-emitting diodes (LEDs). Power devices as semiconductor devices capable of efficiently performing electric power conversion with reduced power loss are becoming more popular in the fields of electric vehicles, hybrid vehicles, quick chargers, and the like. Further, they are likely to be more demanded in the field of new energy such as solar power systems and mega solar systems.

Meanwhile, LED devices, which have advantages such as a longer service life, a smaller size, and lower power consumption as compared with incandescent bulbs, are rapidly becoming more popular in various fields such as illumination, mobile phones, liquid crystal panels, automobiles, traffic lights, street lights, and image display units.

As electronic components become smaller and more sophisticated as described above, the amount of heat generation by a semiconductor device tends to be increasing. Unfortunately, exposure to a high-temperature environment for a long time will prevent an electronic component from functioning normally, and will also reduce its service life. Therefore, a bonding material for use in die bonding (a die-bonding material) usually includes a bonding material with high heat-dissipation performance to dissipate heat generated by a semiconductor device in an efficient way. Usually, depending on applications, a bonding material is required to have a function to allow heat generated by a semiconductor device to efficiency escape to a substrate and a housing, i.e., required to show high heat-dissipation performance.

As described above, high heat-dissipation performance is required for a bonding material used in electronic components, and accordingly, high-temperature lead solder containing a large amount of lead and gold-tin solder containing a large amount of gold have been traditionally and widely used. However, the high-temperature lead solder has a problem in that the solder contains lead which is considered as hazardous to humans. Therefore, a lead-free technology has been actively explored in recent years, and extensive researches have been conducted for switching to a lead-free solder. Gold-tin solder has a disadvantage in terms of cost because it contains gold which is expensive.

In view of the above circumstances, as a promising alternative material to replace high-temperature lead solder and gold-tin solder, an isotropic electrically conductive adhesive (hereinafter, may simply be referred to as "an electrically conductive adhesive") has gathered attentions in recent years. An electrically conductive adhesive is a composite material of a metal particle having functions such as electrical conductivity (for example, silver, nickel, copper, aluminum, or gold) and an organic adhesive having an adhesive function (for example, an epoxy resin, a silicone resin, an acrylic resin, or an urethane resin). The types of the metal particle and organic adhesive used therein may vary. The electrically conductive adhesive is convenient because it is a liquid at room temperature, is free of lead, and is inexpensive. These make the electrically conductive adhesive a promising alternative material to replace high-temperature lead solder and gold-tin solder. Therefore, a significant market growth thereof is predicted.

As described above, an electrically conductive adhesive as an alternative material to replace solder is required to have electrical conductivity as well as high heat-dissipation performance. An organic adhesive used as a raw material of an electrically conductive adhesive basically has a lower thermal conductivity as compared with metal, and thus thermally conductive filler is blended to confer heat dissipation functionality on the electrically conductive adhesive. Minimizing the thermal resistance of an electrically conductive adhesive to effectively dissipating generated heat is the key for developing a technology with regard to electrically conductive adhesives.

As a conventional electrically conductive adhesive having improved thermal conductivity, for example, Patent Literature 1 discloses a composition having high thermal conductivity and electrical conductivity, the composition containing solid components of at least 5 to 80% by weight of a pitch graphitized carbon fiber filler having a mean fiber diameter of 0.1 to 30 μm, an aspect ratio of 2 to 100, a mean fiber length of 0.2 to 200 μm, and a true density of 2.0 to 2.5 g/cc; 15 to 90% by weight of a metal fine-particle filler having a mean particle diameter of 0.001 to 30 μm; and 5 to 50% by weight of a binder resin.

Further, Patent Literature 2 discloses an electrically conductive composition containing: an epoxy resin as a base resin; a phenol-based curing agent as a curing agent; a urethane-modified epoxy resin as a flexibility-imparting agent; and further a powder of, for example, gold, silver, copper, iron, aluminum, aluminum nitride, alumina, crystalline silica as a thermally conductive filler.

Furthermore, Patent Literature 3 describes an adhesive containing: a resin component; a fibrous filler having high thermal conductivity; and a spherical filler having high thermal conductivity including at least one selected from the group consisting of silver, gold, platinum, aluminum nitride, silicon oxide, aluminum oxide, and carbon black, in which the content of the fibrous filler having high thermal conductivity is 0.1 to 20 parts by volume, and the content of the spherical filler having high thermal conductivity is 10 to 200 parts by volume relative to 100 parts by volume of the resin component.

Moreover, Patent Literature 4 describes a non-solvent liquid silver paste composition containing a bisphenol-type epoxy resin, a liquid aromatic amine as a curing agent, and 85 to 95% by weight of a silver powder, in which the composition serves as an adhesive having high thermal conductivity used to bond a heat generating body such as a chip in a semiconductor device to a heat dissipating body such as a lead frame.

As electronic components are becoming smaller and more sophisticated as described above, taking an appropriate measure for conferring high heat-dissipation ability on an electrically conductive adhesive is an important issue in the industry, and thus an electrically conductive adhesive having a proper balance of both high thermal conductivity and electrical conductivity yet remains to be developed.

Accordingly, prior to the present application, the present applicant disclosed a thermally and electrically conductive adhesive composition including: (A) an electrically conductive filler; (B) an epoxy resin; and (C) a curing agent, in which the electrically conductive filler (A) is a submicron fine silver powder, and the content of the fine silver powder is 75 to 94% by mass relative to the total amount of the thermally and electrically conductive adhesive composition; and the content of the epoxy resin (B) is 5 to 20% by mass relative to the total amount of the thermally and electrically conductive adhesive composition; and the curing agent (C) is a compound represented by Formula (I), (II), or (III) (not shown herein), and the content of the compound is 0.4 to 2.4 molar equivalents in terms of equivalent of active hydrogen relative to 1 molar equivalent of epoxy groups in the epoxy resin (B); and during heat curing and before the electrically conductive filler (A) starts to sinter, the thermally and electrically conductive adhesive composition is in an uncured state or a half-cured state (Patent Document 5).

CITATION LIST

Patent Literature

Patent Literature 1: Japanese Unexamined Patent Application, Publication No. 2008-186590
Patent Literature 2: Japanese Unexamined Patent Application, Publication No. H6-322350
Patent Literature 3: Japanese Unexamined Patent Application, Publication No. 2009-84510
Patent Literature 4: Japanese Unexamined Patent Application, Publication No. 2004-277572
Patent Literature 5: Japanese Unexamined Patent Application, Publication No. 2014-125596

SUMMARY

Technical Problem

An object of the present invention is to provide a thermally and electrically conductive adhesive composition used as a die-bonding material, the thermally and electrically conductive adhesive composition showing high heat dissipation performance and stable electric conductivity as well as high adhesion force.

Solution to Problem

The present inventors conducted extensive studies to achieve the above object by repeating various trial-and-errors with thermally and electrically conductive adhesive compositions with varied components and blending ratios. Then the present invention has been completed.

That is, the present invention provides a thermally and electrically conductive adhesive composition including:
(A) an electrically conductive filler,
(B) an epoxy resin,
(C) a curing agent,
(D) an organic solvent, in which
the electrically conductive filler (A) is a submicron fine silver powder, and the content of the electrically conductive filler (A) is such that (A)/(B) is 96.0/4.0 to 99.5/0.5 in the mass ratio to the content of the epoxy resin (B), and
the epoxy resin (B) includes at least a bisphenol-type epoxy resin and a novolac-type epoxy resin, and
the curing agent (C) is diaminodiphenyl sulfone and/or a derivative thereof, and the content of the curing agent (C) is 0.4 to 2.4 molar equivalents in terms of equivalent of active hydrogen relative to 1 molar equivalent of epoxy groups in the epoxy resin (B).

Advantageous Effects of Invention

The present invention provides a thermally and electrically conductive adhesive composition showing high heat dissipation performance and stable electrical conductivity as well as high adhesion force.

DESCRIPTION OF EMBODIMENTS

The thermally and electrically conductive adhesive composition (hereinafter, may simply be referred to as "an adhesive composition") according to the present invention includes the electrically conductive filler (A), the epoxy resin (B), the curing agent (C), and the organic solvent (D) as essential components. The reason why the adhesive composition according to the present invention shows high heat dissipation performance is not completely understood, but may be explained as follows. The adhesive composition shows a slower curing rate, and thus the dispersity of the electrically conductive filler over the epoxy resin as a binder resin is improved more than conventional dispersity. As a result, necking of the electrically conductive filler is promoted to allow the dispersed electrically conductive filler to fuse with each other during heat curing. This enables sufficient formation of heat-transmitting networks of the electrically conductive filler. Further, according to the present invention, a silver power as an electrically conductive filler having high thermal conductivity is contained more than in conventional products, but a problem of decreased adhesion force due to an increased content of the electrically conductive filler is solved by virtue of the epoxy resin (B) and the curing agent (C) specified in the present invention.

Below, the components: the electrically conductive filler (A), the epoxy resin (B), the curing agent (C), and the solvent (D) will be described in detail.

As the electrically conductive filler (A), a fine silver powder in the order of submicrons (that is, smaller than 1 µm) is used. The mean particle diameter of the fine silver powder is preferably 300 to 900 nm. Further it is more preferably 400 to 800 nm. When the mean particle diameter is less than 300 nm, the aggregation force of the fine silver powder may be increased to significantly decrease the dispersibility. As a result, the fine silver powder may aggregate immediately after preparation of the adhesive composition, or crystal growth due to sintering may become excessive during heat curing. Consequently, sufficient electrical conductivity and/or sufficient thermal conductivity may not be obtained. On the other hand, when the mean particle diameter is more than 900 nm, the number of particles of the fine particle powder in the epoxy resin may be decreased, and in addition, adequate crystal growth due to sintering may not be obtained. Consequently, sufficient electrical conductivity and/or sufficient thermal conductivity may not be obtained.

In the present invention, the mean particle diameter of the fine silver powder as the electrically conductive filler (A) may be determined by the following method. That is, a portion of the adhesive composition is sampled, and photographed under a field emission scanning electron microscope (JMS-6700F, JEOL Ltd. DATUM Solution Business Operations). Then, the resulting projected photograph is used to randomly sample 100 silver particles located in the adhesive composition photographed. A diameter (an outer diameter) corresponding to a projected circular area is measured for each of the silver particles. The mean value thereof is considered as the mean particle diameter of the fine silver powder.

There is no particular limitation for the shape of the fine silver powder. Examples of the shape include a spherical shape, a flake-like shape, a foil-like shape, and a dendritic shape, but a flake-like shape or a spherical shape is generally selected. Further, the fine silver powder may be a pure silver powder, a metal particle coated with silver on the surface, or a mixture thereof. The fine silver powder may be a commercially available product, or prepared by a known method. There is no particular limitation for the method of preparing the fine silver powder. Any method may be used, including the mechanical grinding method, the reductive method, the electrolytic method, and the gas phase method.

A submicron fine silver powder used as the electrically conductive filler (A) is coated with a coating agent on the surface, and the coating agent preferably contains carboxylic acid. Use of a coating agent containing carboxylic acid can further improve the heat dissipation performance of the adhesive composition. This can be explained as follows. The curing agent (C) used in the present invention serves to release the coating agent from the surface of the fine silver powder. This, along with the slowed curing rate of the adhesive composition according to the present invention, may further promote the electrically conductive filler to fuse with each other.

There is no particular limitation for carboxylic acid contained in the coating agent. Examples of carboxylic acid include monocarboxylic acid, polycarboxylic acid, oxycarboxylic acid, and the like.

Examples of the monocarboxylic acid include, for example, aliphatic monocarboxylic acid having 1 to 24 carbon atoms such as acetic acid, propionic acid, butyric acid, valeric acid, caprylic acid, caproic acid, capric acid, lauric acid, myristic acid, palmitic acid, stearic acid, arachidic acid, behenic acid, and lignoceric acid. Alternatively, unsaturated aliphatic carboxylic acid having 4 to 24 carbon atoms such as oleic acid, linoleic acid, α-linolenic acid, γ-linolenic acid, dihomo-γ-linolenic acid, elaidic acid, arachidonic acid, erucic acid, nervonic acid, stearidonic acid, eicosapentaenoic acid, and docosahexaenoic acid may also be used. Further, aromatic monocarboxylic acid having 7 to 12 carbon atoms such as benzoic acid and naphthoic acid can also be used.

Examples of the polycarboxylic acid include, for example, aliphatic polycarboxylic acid having 2 to 10 carbon atoms such as oxalic acid, malonic acid, succinic acid, glutaric acid, adipic acid, azelaic acid, and sebacic acid; aliphatic unsaturated polycarboxylic acid having 4 to 14 carbon atoms such as maleic acid, fumaric acid, itaconic acid, sorbic acid, and tetrahydrophthalic acid; and aromatic polycarboxylic acid such as phthalic acid and trimellitic acid.

Examples of the oxycarboxylic acid include, for example, aliphatic hydroxymonocarboxylic acid such as glycolic acid, lactic acid, oxybutyric acid, and glyceric acid; aromatic hydroxymonocarboxylic acid such as salicylic acid, oxybenzoic acid, and gallic acid; and hydroxypolycarboxylic acid such as tartaric acid, citric acid, and malic acid.

In the coating agent to treat the surface of the fine silver powder, a higher fatty acid having 10 or more carbon atoms or a derivative thereof can be included to reduce aggregation of the fine silver powder. Examples of such a higher fatty acid include lauryl acid, myristyl acid, palmitic acid, stearic acid, oleic acid, linolic acid, linolenic acid, and lignoceric acid. Examples of a derivative of the higher fatty acid include higher fatty acid metal salts, higher fatty acid esters, and higher fatty acid amides.

The carboxylic acid to be included in the coating agent may be a mixture of two or more of the aforementioned carboxylic acids. Moreover, among the aforementioned carboxylic acids, higher fatty acids as saturated fatty acids or unsaturated fatty acids having 12 to 24 carbon atoms are preferred.

The surface of the fine silver powder may be coated by a publicly known method such as a method involving stirring and kneading the fine silver powder with the coating agent in a mixer or a method involving impregnating the fine silver powder with a solution of a carboxylic acid and then evaporating the solvent.

In the adhesive composition according to the present invention, the contents of the electrically conductive filler (A) and the epoxy resin (B) are adjusted so that the mass ratio of the contents of the electrically conductive filler (A) and the epoxy resin (B) in the adhesive composition is in the range of (A)/(B)=96.0/4.0 to 99.5/0.5, preferably in the range of (A)/(B)=97/3 to 99/1. When the (A)/(B) falls outside the range of 96.0/4.0 to 99.5/0.5, stable electric conductivity, thermal conductivity, and adhesion force may not be obtained.

Further, the content of the electrically conductive filler (A) is generally adjusted in the range of 80 to 96% by mass relative to the total amount of the adhesive composition according to the present invention. When the content is less than 80% by mass, stable electric conductivity, thermal conductivity, and adhesion force may not be obtained. On the other hand when it is more than 96% by mass, low viscosity and adequate adhesive strength may be difficult to obtain. The content is preferably 83 to 90% by mass, and optimally 84 to 88% by mass.

In the adhesive composition according to the present invention, an additional electrically conductive filler can be used in combination as long as the effects of the present invention are not impaired. There is no particular limitation for such an electrically conductive filler as long as it has electrical conductivity, but it is preferably a metal, a carbon nanotube, or the like. With regard to the metal, a powder of any metal commonly considered as an electrically conductive material can be used. Examples include elementary metals such as nickel, copper, silver, gold, aluminum, chromium, platinum, palladium, tungsten, and molybdenum, alloys of two or more of these metals, articles coated with these metals, compounds of these metals having good electrical conductivity, and the like.

The epoxy resin (B) is a compound having two or more epoxy groups per molecule. A liquid epoxy resin is used. Specific examples of the aforementioned liquid epoxy resin include condensation products of epichlorohydrin with polyphenols such as bisphenols or with polyhydric alcohol, for example, glycidyl ether-type epoxy resins such as bisphenol A-type epoxy resins, brominated bisphenol A-type epoxy resins, hydrogenated bisphenol A-type epoxy resins, bisphenol F-type epoxy resins, bisphenol S-type epoxy resins, bisphenol AF-type epoxy resins, bisphenol AD-type epoxy resins, biphenyl-type epoxy resins, naphthalene-type epoxy resins, fluorene-type epoxy resins, bisphenol A novolac-type epoxy resins, phenol novolac-type epoxy resins, cresol novolac-type epoxy resins, tris(hydroxyphenyl)methane-type epoxy resins, and tetraphenylol ethane-type epoxy resins. In addition, examples include, but not limited to, glycidyl ester-type epoxy resins which can be obtained by condensation of epichlorohydrin with carboxylic acid such as phthalic acid derivatives or fatty acids; glycidyl amine-type epoxy resins which can be obtained by reacting epichlorohydrin with amines, cyanuric acids, or hydantoins; and further epoxy resins modified by various methods.

In the present invention, at least a bisphenol-type epoxy resin and a novolac-type epoxy resin are included in the (B) epoxy resin. Combined use of a bisphenol-type epoxy resin and a novolac-type epoxy resin can prevent decreased adhesion force due to an increased content of the fine silver powder as an electrically conductive filler. This can provide high thermal conductivity and stable electric conductivity. Bisphenol-type epoxy resins include epoxy resins such as bisphenol A-type epoxy resins, brominated bisphenol A-type epoxy resins, hydrogenated bisphenol A-type epoxy resins, bisphenol F-type epoxy resins, bisphenol S-type epoxy resins, bisphenol AF-type epoxy resins, and bisphenol AD-type epoxy resins. Among these, bisphenol A-type epoxy resins and bisphenol F-type epoxy resin are preferably used. Further, novolac-type epoxy resins include epoxy resins such as bisphenol A novolac-type epoxy resins, phenol novolac-type epoxy resins, and cresol novolac-type epoxy resins. Among these, phenol novolac-type epoxy resins and cresol novolac-type epoxy resins are preferably used.

The mass ratio of a bisphenol-type epoxy resin and a novolac-type epoxy resin included in the epoxy resin (B) is preferably bisphenol-type epoxy resin/novolac-type epoxy resin=40/60 to 80/20, more preferably 50/50 to 70/30 in view of obtaining the aforementioned effects from the combined use of the both epoxy resins.

In general, the content of the epoxy resin (B) is preferably 0.3 to 4.0% by mass relative to the total amount of the adhesive composition according to the present invention. A content of less than 0.3% by mass may decrease adhesion force, resulting in decreased bonding reliability while a content of more than 4.0% by mass may compromise formation of networks which otherwise occurs upon sintering the electrically conductive filler, resulting in insufficient electrical and thermal conductivity. The content is more preferably 0.4 to 3.7% by mass.

As the curing agent (C), used is diaminodiphenyl sulfone and/or a derivative thereof. This can provide suitable curing retardation effect, and further promote sintering growth and network formation of the electrically conductive filler by virtue of interactions with the electrically conductive filler. Specific examples of the above curing agent include compounds represented by following general formula (I), (II), or (III). Among these, 4,4'-diaminodiphenyl sulfone and 3,3'-diaminodiphenyl sulfone are in particular preferably used. Examples of the lower alkyl group in the general formula (I), (II), or (III) include linear, branched, or annular alkyl groups having 1 to 6 carbon atoms. Among these, linear or branched alkyl groups having 1 to 3 carbon atoms are preferred, and a methyl group or an ethyl group is particularly preferred. It is noted that other publicly known curing agents may be used in combination as long as they do not impair the effects of the present invention.

[Chem. 1]

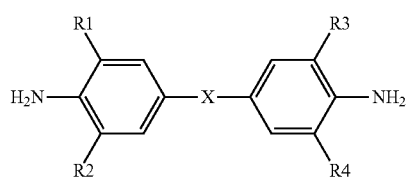

(I)

(wherein X represents —SO2-, and R1 to R4 each independently represent a hydrogen atom or a lower alkyl group.)

[Chem. 2]

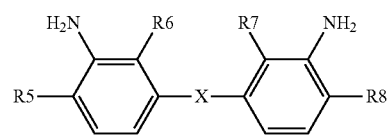

(II)

(wherein X represents —SO2-, and R5 to R8 each independently represent a hydrogen atom or a lower alkyl group.)

[Chem. 3]

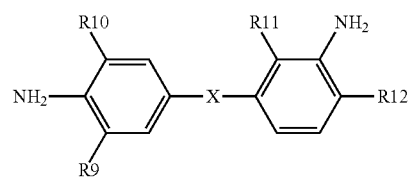

(III)

(wherein X represents —SO2-, and R9 to R12 each independently represent a hydrogen atom or a lower alkyl group.)

The content of the curing agent (C) is 0.4 to 2.4 molar equivalents in terms of equivalent of active hydrogen relative to 1 molar equivalent of epoxy groups in the epoxy resin (B), and preferably 0.5 to 2.0 molar equivalents. When the content of the curing agent (C) is less than 0.4 molar equivalent in terms of equivalent of active hydrogen, curing may be insufficient, resulting in impaired heat resistance. Thermal conductivity may be decreased even when curing is sufficient. When the content is more than 2.4 molar equivalents, curing may be insufficient, resulting in impaired heat resistance. High elasticity required for an adhesive may not be obtained even when curing is sufficient. In the present invention, the equivalent of active hydrogen is calculated based on the number of active hydrogen atoms on the nitrogen atom of an amino group in a compound used as the curing agent. The above compound has two amino groups per molecule, and thus has four active hydrogen atoms per molecule. Therefore, the active hydrogen equivalent of 1 mol of the compound used as the curing agent in the present invention corresponds to 4 molar equivalents.

The organic solvent (D) may be any as long as it is generally used in epoxy-based adhesive compositions. Examples of the organic solvent (D) include, for example, organic solvents such as butylcarbitol, butylcarbitol acetate, ethylcarbitol, ethylcarbitol acetate, 2,4-diethyl-1,5-pentanediol, 2,4-dimethyl-1,5-pentanediol, butylcellosolve, butylcellosolve acetate, ethylcellosolve, ethylcellosolve acetate, γ-butyrolactone, isophorone, glycidyl phenyl ether, and triethylene glycol dimethyl ether. Among these, butylcarbitol acetate, 2,4-diethyl-1,5-pentanediol, and 2,4-dimethyl-1,5-pentanediol are suitable. It is noted that the organic solvents may be used alone or in combination of two or more.

There is no particular limitation for the content of the organic solvent (D), but it is generally 3 to 17% by mass relative to the total amount of the adhesive composition according to the present invention, preferably 5 to 15% by mass, and optimally 9 to 15% by mass.

A curing accelerator may also be blended with the adhesive composition according to the present invention. Examples of the curing accelerator include imidazoles such as 2-phenyl-4,5-dihydroxymethylimidazole, 2-phenyl-4-methyl-5-hydroxymethylimidazole, 2-methyl-4-methylimidazole, and 1-cyano-2-ethyl-4-methylimidazole; tertiary amines; triphenylphosphines; urea-based compounds; phenols; alcohols; and carboxylic acids. Curing accelerators may be used alone or in combination of two or more.

There is no particular limitation for the content of an curing accelerator, but it is generally 0.1 to 2.0% by mass relative to the total amount of the adhesive composition according to the present invention when it is used.

In the adhesive composition according to the present invention, an additional additive such as an antioxidant, an ultraviolet absorber, a tackifier, a dispersant, a coupling agent, a toughness-imparting agent, and an elastomer can be blended as appropriate provided that the effects of the present invention are not impaired.

The adhesive composition according to the present invention can be obtained by mixing and stirring the components (A), (B), (C), (D) and other components in any order. With regard to the method of dispersion, a twin roll mill, a triple roll mill, a sand mill, a roller mill, a ball mill, a colloid mill, a jet mill, a bead mill, a kneader, a homogenizer, a propellerless mixer, and the like may be used.

The adhesive composition according to the present invention is useful as a bonding material (a die-bonding material) for bonding a semiconductor device to the surface of a supporting base such as a lead frame and a substrate. In general, the present adhesive composition is applied on the surface of a supporting base, on which a semiconductor device is then placed. Heat curing is then performed to effect bonding. In that case, heat curing is usually performed under conditions of 180 to 250° C. for 10 to 300 minutes. Further, the adhesive composition according to the present invention can be applied on supporting bases of various materials, such as supporting bases in which gold, silver, nickel, palladium, or an alloy thereof is plated on the surface of copper or a copper alloy material, for example.

EXAMPLES

Below, the present invention will be described more specifically with reference to Examples, but the present invention shall not be limited in any way to these Examples.

Examples 1 to 6, Comparative Examples 1 to 3

A. Preparation of Adhesive Composition

The materials shown in Table 1 were kneaded with a triple roll mill to prepare an adhesive composition having a composition shown in Table 1 (the numerical value for each material represents % by mass relative to the total mass of the adhesive composition). The materials used are as follows.

[Electrically Conductive Filler]
Flake-like silver powder (which has been subject to surface treatment with a coating agent, stearic acid. Mean particle diameter: 500 nm, Tanaka Kikinzoku Kogyo K. K.)

[Epoxy Resin]
Bisphenol F-type epoxy resin ("EPICLON 831-S" (Product name), Dainippon Ink & Chemicals, Inc., liquid at room temperature, epoxy equivalent=169 g/eq)

Bisphenol A-type epoxy resin ("EPICLON 850-S" (Product name), Dainippon Ink & Chemicals, Inc., liquid at room temperature a liquid, epoxy equivalent=188 g/eq)

Phenol novolac-type epoxy resin ("EPALLOY 8330" (Product name), Emerald Performance Materials, liquid at room temperature, epoxy equivalent=177 g/eq)

Cresol novolac-type epoxy resin ("EPICLON N-665" (Product name), Dainippon Ink & Chemicals, Inc., liquid at room temperature, epoxy equivalent=207 g/eq)

[Curing Agent]
4,4'-diaminodiphenyl sulfone (molecular weight 248.3, Tokyo Chemical Industry Co., Ltd.)

3,3'-diaminodiphenyl sulfone (molecular weight 248.3, Tokyo Chemical Industry Co., Ltd.)

[Additive]
2-phenyl-4-methyl-5-hydroxymethylimidazole ("Curezol 2P4MHZ" (Product name), Shikoku Chemicals Corp.)

[Solvent]
Butylcarbitol acetate (Kanto Chemical Co., Inc.)

2,4-diethyl-1,5-pentanediol ("Nikko MARS" (Product name), Nippon Koryo Yakuhin Kaisha, Ltd.)

2,4-dimethyl-1,5-pentanediol (Nippon Koryo Yakuhin Kaisha, Ltd.)

B. Evaluation of Physical Properties of Adhesive Composition

1. Measurement of Die Shear Strength

The die shear strength of the adhesive composition was measured to evaluate the adhesive strength of the adhesive composition. The adhesive composition was applied to a copper lead frame plated with silver so that the film thickness after curing was about 25 mm. A 5×5 mm silicon chip (thickness: 0.625 mm) was mounted thereon, and heat treated at 60° C. for 30 minutes to evaporate the solvent contained therein. Then, curing was performed under air atmosphere at 210° C. for 180 minutes to prepare a sample for measuring die shear strength. The above sample was measured for the die shear strength (N/5 mm □) under conditions of a shear rate of 0.2 mm/sec and a temperature of 23° C. using a die shear strength measuring instrument ["Dage series 4000" (Product name), Nordson Corporation). Results are shown in Table 1.

2. Measurement of Volume Resistance Values

The volume resistance of the adhesive composition was measured to evaluate the electric conductivity of the adhesive composition. The adhesive composition was applied on a glass supporting base for a length of 50 mm and a width of 5 mm so that the film thickness after curing was about 0.03 mm. Heat curing was then performed as described above to prepare a sample for measuring volume resistance. The above sample was measured for volume resistance ($\mu\Omega\cdot cm$) using a resistor ("HIOKI 3540" (Product name), Hioki E. E. Corp.) (Product name)). Results are shown in Table 1.

3. Measurement of Thermal Conductivity

The thermal conductivity of the adhesive composition was measured to evaluate the thermal conductivity of the adhesive composition. The thermal conductivity $\lambda$ (W/m·K) was computed by the following formula as described below. The thermal diffusion a was measured in accordance with ASTM-E1461 using a laser flash method thermal constant measuring system ("TC-7000" (Product name), ULVAC-RIKO, Inc.). The specific gravity d at the room temperature was computed by the pycnometer method. Further, the specific heat Cp at the room temperature was measured in accordance with JIS-K7123 using a differential scanning calorimeter ("DSC 7020" (Product name), SEIKO Electronics industrial Co., Ltd.) Results are shown in Table 1.

$$\lambda = a \times d \times Cp$$

TABLE 1

| | | | Examples | | | | | | Comparative Examples | |
|---|---|---|---|---|---|---|---|---|---|---|
| | | | 1 | 2 | 3 | 4 | 5 | 6 | 1 | 2 |
| Electrically conductive filler (Content: mass %) | | Silver powder(Mean particle diameter d50: 500 nm) | 87.9 | 86.1 | 84.3 | 86.4 | 87.0 | 87.9 | 84.8 | 89.3 |
| Epoxy resin (Content: mass %) | Bisphenol-type epoxy resin | Bisphenol F-type epoxy resin | 0.533 | 1.599 | | 2.125 | 11.533 | 0.711 | 2.66 | |
| | | Bisphenol A-type of epoxy resin | | | 0.169 | | | | | |
| | Novolac-type epoxy resin | Phenol novolac-type epoxy resin | 0.355 | 1.066 | 0.254 | 1.425 | | 0.177 | 1.80 | |
| | | Cresol novolac-type epoxy resin | | | | | 0.355 | | | |
| Curing agent (Content: mass %) | | 4,4'-diamioxliphenyl sulfone (molecular weight: 248.3) | 0.481 | 1.468 | 0.290 | 0.649 | 0.453 | | 2.412 | |
| | | Active hydrogen equivalent to epoxy groups (molar equivalent) | 1.5 | 1.5 | 2.0 | 0.5 | 1.5 | | 1.5 | |
| | | 3,3'-diaminoliphenyl sulfone (molecular weight: 248.3) | | | | | | 0.485 | | |
| | | Active hydrogen equivalent to epoxy groups (molar equivalent) | | | | | | 1.5 | | |
| Additive (Content: mass %) | | 2-phenyl 4-methyl-5-hydroxymethylinudazole | | | | | 0.01 | | | |
| Solvent (Content: mass %) | | Butylerthiol acetate | 10.7 | 9.8 | | 9.3 | 10.8 | | | |
| | | 2,4-diethyl-1,5-pentanediol | | | 15.0 | | | | | |
| | | 2,4-dimethyl-1,5-pentanediol | | | | | | 10.7 | 8.3 | 10.7 |
| Electrically conductive filler/Epoxy resin (mass ratio) | | | 99/1 | 97/3 | 99.5/0.5 | 96/4 | 99/1 | 99/1 | 95/5 | 100/0 |
| Bisphenol type epoxy resin/Novolac-type epoxy resin (mass ratio) | | | 60/40 | 60/40 | 40/60 | 59/41 | 60/40 | 80/20 | 60/40 | — |
| Die shear strength (N/5 mm · Ω) | | | 155 | 158 | 128 | 162 | 167 | 122 | 157 | 12 |
| Volume resistance value (μΩ · cm) | | | 9.8 | 14.3 | 11.1 | 15.8 | 10.3 | 12.0 | 16 | 10.5 |
| Thermal conductivity (W/m · K) | | | 115 | 60.5 | 70 | 52 | 111 | 104 | 33 | 38 |

The above results demonstrate that the adhesive composition according to the present invention shows high heat dissipation performance and stable electric conductivity as well as high adhesion force.

The invention claimed is:
1. A thermally and electrically conductive adhesive composition, comprising:
 (A) an electrically conductive filler,
 (B) an epoxy resin,
 (C) a curing agent,
 (D) an organic solvent, wherein
 the electrically conductive filler (A) is a submicron fine silver powder, and the content of the electrically conductive filler (A) is such that (A)/(B) is 96.0/4.0 to 99.5/0.5 in the mass ratio to the content of the epoxy resin (B), and
 the epoxy resin (B) comprises at least a bisphenol-type epoxy resin and a novolac-type epoxy resin, and
 the curing agent (C) is diaminodiphenyl sulfone and/or a derivative thereof, and the content of the curing agent (C) is 0.4 to 2.4 molar equivalents in terms of equivalent of active hydrogen relative to 1 molar equivalent of epoxy groups in the epoxy resin (B),
 wherein the mass ratio of the bisphenol-type epoxy resin and the novolac-type epoxy resin contained in the epoxy resin (B) is such that bisphenol-type epoxy resin/novolac-type epoxy resin is 60/40 to 80/20.
2. The thermally and electrically conductive adhesive composition according to claim 1, wherein the curing agent (C) is a compound represented by the following general formula (I), (II), or (III):

[Chem. 1]

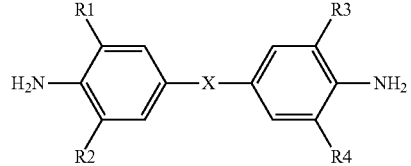

(I)

wherein X represents —SO2-, and R1 to R4 each independently represent a hydrogen atom or a lower alkyl group,

[Chem. 2]

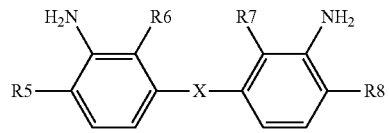

(II)

wherein X represents —SO2-, and R5 to R8 each independently represent a hydrogen atom or a lower alkyl group,

[Chem. 3]

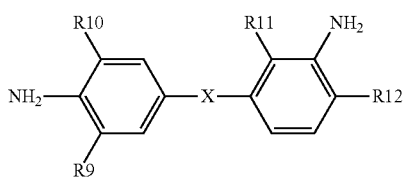

(III)

wherein X represents —SO2-, and R9 to R12 each independently represent a hydrogen atom or a lower alkyl group.

3. The thermally and electrically conductive adhesive composition according to claim 2, wherein the submicron fine silver powder used in the electrically conductive filler (A) is coated with a coating agent, a surface of the coating agent comprising carboxylic acid.

4. The thermally and electrically conductive adhesive composition according to claim 2, wherein the content of the epoxy resin (B) is 0.3 to 4.0% by mass relative to the total amount of the thermally and electrically conductive adhesive composition.

5. The thermally and electrically conductive adhesive composition according to claim 1, wherein the submicron fine silver powder used in the electrically conductive filler (A) is coated with a coating agent, a surface of the coating agent comprising carboxylic acid.

6. The thermally and electrically conductive adhesive composition according to claim 5, wherein the content of the epoxy resin (B) is 0.3 to 4.0% by mass relative to the total amount of the thermally and electrically conductive adhesive composition.

7. The thermally and electrically conductive adhesive composition according to claim 1, wherein the content of the epoxy resin (B) is 0.3 to 4.0% by mass relative to the total amount of the thermally and electrically conductive adhesive composition.

* * * * *